United States Patent [19]

Duarte et al.

[11] 4,060,365
[45] Nov. 29, 1977

[54] DOUGH PRESS

[76] Inventors: Ruben G. Duarte; Manuel G. Duarte, both of 1012 E. Nevada, El Paso, Tex. 79902

[21] Appl. No.: 566,115

[22] Filed: Apr. 8, 1975

[51] Int. Cl.² .............................................. A21C 9/00
[52] U.S. Cl. ..................................... 425/214; 425/409
[58] Field of Search .................... 425/409, 418, 451.5, 425/451.6, 214; 74/42; 100/202, 233, 282

[56] References Cited

U.S. PATENT DOCUMENTS

| 1,133,347 | 3/1915 | Wiegand | 425/110 |
| 1,680,463 | 8/1928 | Magaziner | 425/409 |
| 2,272,850 | 2/1942 | Poole | 425/124 |
| 2,558,140 | 6/1951 | Kruzik | 100/282 X |
| 2,694,845 | 11/1954 | Montague | 425/418 |
| 3,761,216 | 9/1973 | Duarte et al. | 425/214 |

FOREIGN PATENT DOCUMENTS

| 513,800 | 4/1938 | United Kingdom | 425/409 |

*Primary Examiner*—J. Howard Flint, Jr.
*Assistant Examiner*—W. R. Briggs
*Attorney, Agent, or Firm*—Clarence A. O'Brien; Harvey B. Jacobson

[57] ABSTRACT

A support is provided including a lower stationary horizontal plate and a generally horizontal support arm is spaced above and extends over the lower plate. The portion of the support arm disposed in vertical registry with the lower plate has an upper plate supported therefrom closely overlying the lower plate and a first end portion of the support arm is pivotally supported from the support for oscillation about a horizontal axis extending transversely of the support arm. Structures for heating the upper and lower plates are operatively associated therewith and a motor having a rotatable output shaft is mounted on the support and a pitman arm is removably operably connected between the rotatable output shaft and an extension of the pivoted end portion of the support arm for oscillation of the arm and swinging movement of the upper plate about the axis of oscillation of the support arm toward and away from the lower plate in response to rotation of the shaft. Further, the end portion of the support arm remote from its pivot axis is provided with a removable endwise outwardly projecting handle and a gravity type counterbalance structure is operably connected to the support arm for overbalancing the support arm for upward swinging of the free end of the support arm, and thus the upper plate, away from the lower plate.

1 Claim, 3 Drawing Figures

U.S. Patent  Nov. 29, 1977  4,060,365
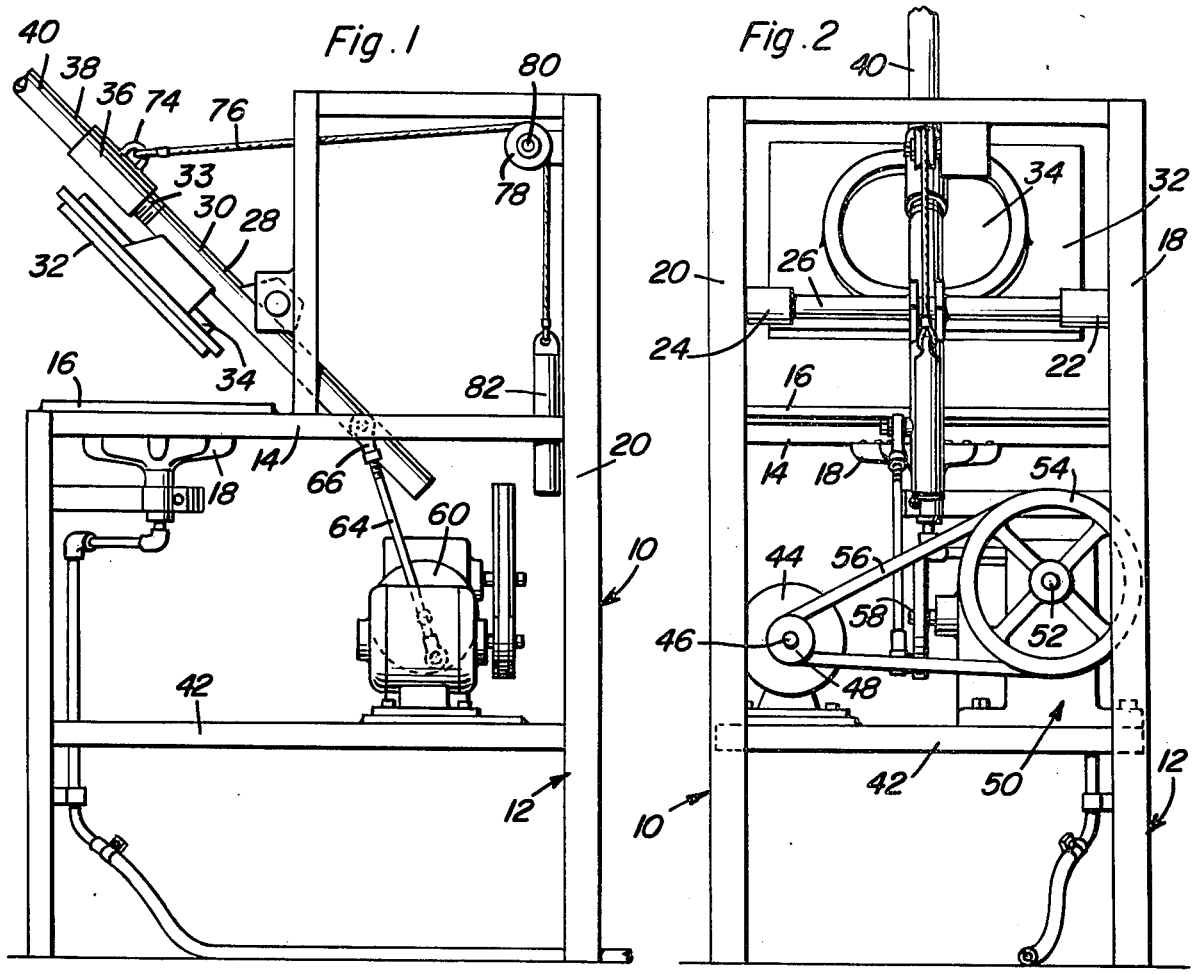
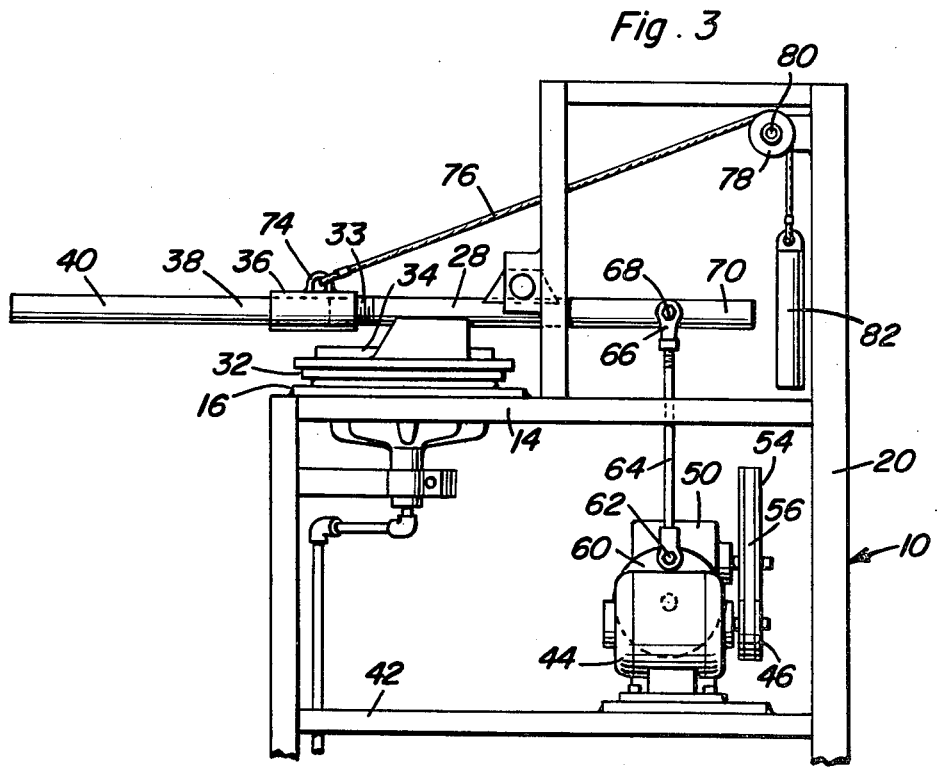

DOUGH PRESS

BACKGROUND OF THE INVENTION

The dough press of the instant invention comprises an improvement over the dough press disclosed in U.S. Pat. No. 3,761,216, dated Sept. 25, 1973.

Various types of dough presses including manually operable dough presses and automatically operable dough presses (such as that disclosed in the above-mentioned prior U.S. patent) have been heretofore designed. Of course, a manually operated dough press is more reliable than a motor-driven or automatically operable dough press, but the manual dough press must be manually operated by the operator at all times. On the other hand, an automatically operated or power-driven dough press, while not requiring manual operation by the operator thereof, is subject to breakdown and in most instances an automatically or power-operated dough press may not be readily manually operated. Accordingly, both types of dough presses have certain disadvantages.

BRIEF DESCRIPTION OF THE INVENTION

The dough press of the instant invention is of the automatically or power-operated type and therefore does not require continuous manual actuation by the operator thereof. On the other hand, the driving connection between the driving motor of the dough press and the oscillatable support arm of the dough press is readily disconnectible and the support arm is counterbalanced. Accordingly, if the drive system of the automatic dough press incurs a breakdown, the driving connection between the motor thereof and the oscillatable support arm may be readily disconnected. Further, the support arm of the dough press includes a readily removable handle supported therefrom whereby the handle may be engaged with the support arm and utilized to manually actuate the dough press after the driving connection between the motor of the press and the oscillatable support arm has been disconnected. In this manner, the advantages of both an automatic dough press and a manually operated dough press are realized.

The main object of this invention is to provide a dough press of the motor-driven type, but constructed in a manner whereby the driving connection between the motor and the oscillatable support arm of the press may be readily disconnected and the support arm may be provided with a removable handle for manual operation of the dough press in the event of a breakdown in the motor drive train thereof.

Another object of this invention, in accordance with the immediately preceding object, is to provide a dough press of the motor-driven type and including a support arm which is counterbalanced and which may therefore be more easily manually operated in the event of a failure of the drive train of the dough press.

Another object of this invention is to provide an improved dough press including a readily adjustable motor-driven drive system.

A final object of this invention to be specifically enumerated herein is to provide a dough press which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the dough press of the instant invention;

FIG. 2 is a rear elevational view of the dough press as seen from the right side of FIG. 1; and FIG. 3 is a fragmentary side elevational view of the dough press with the support arm thereof in a lowered horizontal position and the removable handle operably engaged with the forward end of the support arm.

DETAILED DESCRIPTION OF THE INVENTION

Referring now more specifically to the drawings, the numeral 10 generally designates an improved dough press constructed in accordance with the present invention. The dough press 10 includes an upright frame referred to in general by the reference numeral 12 including an intermediate height portion 14 from which a lower horizontal plate 16 is supported. A heating unit in the form of a gas burner 18 is supported beneath the plate 16 for the purpose of heating the latter.

The frame 12 includes opposite side portions 18 and 20 from which a pair of aligned journals 22 and 24 are supported and a support shaft 26 extends between and has its opposite ends rotatably supported from the journals 22. A support arm 28 is supported, centrally intermediate its opposite ends, from the central portion of the support shaft 26 and is oscillatable with the latter between the lowered horizontal position thereof illustrated in FIG. 3 of the drawings and the raised inclined position thereof illustrated in FIG. 1 of the drawings. The forward end portion 30 of the support arm 28 mounts an upper plate 32 having electrical resistance type heating means 34 operatively associated therewith. Upon oscillation of the support arm 28 the upper plate 32 is swingable from the raised position thereof illustrated in FIG. 1 to the lowered position thereof illustrated in FIG. 3 closely overlying the lower plate 16.

The forward end portion of the support arm 28 is externally threaded as at 33 and has one end of a coupling sleeve 36 threadedly engaged thereon. The other end of the coupling sleeve 36 is open and telescopingly receives one end 38 of a readily removable handle 40 therein for manual oscillation of the support arm 28 between the positions thereof illustrated in FIGS. 1 and 3 of the drawings by a person disposed to the front of the frame 12, the left side thereof illustrated in FIGS. 1 and 3.

The frame 12 includes a lower horizontal support 42 from which an electric motor 44 is supported and the motor 44 includes a rotatably output shaft 46 upon which a pulley wheel 48 is mounted. A reduction gear assembly referred to in general by the reference numeral 50 is also mounted from the support structure 42 and includes a rotatable input shaft 52 having a large diameter pully wheel 54 mounted thereon aligned with the pully wheel 48. An endless flexible belt 56 is trained over the pulley wheels 48 and 54 and the gear reduction assembly 50 includes a rotatable output shaft 58 upon which a crank disk 60 is mounted. The outer side of the crank disk 60 carries an outwardly projecting crankpin 62 upon which one end of a pitman arm or connecting rod 64 is journaled. The other end of the pitman arm 64 has a terminal end portion 66 threadedly engaged therewith whereby the effective length of the pitman arm 64 may be adjusted and the terminal end portion 66 in journaled on a stub pin portion or fastener 68 carried by the end portion 70 of the support arm 28 on the side of the support shaft 26 remote from the upper plate 32.

Accordingly, rotation of the crank disk 60 is effective to cause oscillation of the support arm 28 between the positions thereof illustrated in FIGS. 1 and 3 of the drawings and it is to be understood that the fastener 68 is readily removable from the end portion 70 of the support arm 28 whereby the motor-driven drive assembly for the dough press 10 may be readily disconnected.

The coupling sleeve 36 has an anchor eye 74 supported therefrom and one end of an elongated flexible tension member 76 is secured to the anchor eye 74. The other end portion of the tension member 76 is passed over a support pulley 78 journaled from an upper portion of the frame 12 as at 80 above the elevation of the support shaft 26 and the tension member 76 depends downwardly from the support pulley 78 and is attached to a weight member 82. The weight member and tension member 76 serve as a counterbalance for the support arm 28 and tend to swing the support arm 28, even with the handle 40 supported therefrom, to the raised position thereof illustrated in FIG. 1 of the drawings when the pivot fastener 68 is removed from engagement with the support arm 28 in order to disconnect the motor drive assembly from the support arm 28. Thus, with the support arm 28 and handle 40 counterbalanced, manual operation of the dough press 10 from the front side of the frame 12 may be readily carried out should it become necessary to make repairs to the motor drive system including the motor 44, the gear reduction assembly 50 and the pitman arm 64. Still further, when the aforementioned motor drive assembly is operative, the handle 40 is readily removed from the sleeve 36 and the length of the pitman arm 64 may be varied in order to vary the spacing between the plates 32 and 16 when the plate 32 is disposed in its lowermost position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A dough press comprising a support having front, rear and opposite side portions and including a lower stationary horizontally oriented plate supported from the front portion of said support, a single generally horizontal front to rear extending support arm spaced above and extending over said lower plate, the front end portion of said arm disposed over said lower plate having an upper plate suspended therefrom closely overlying said lower plate, said upper and lower plates having heating means operatively associated therewith for heating said plates, said opposite side portions including elevated rear portions from which a pair of horizontally aligned journals are supported, the rear end portion of said arm disposed to the rear of said plates including a horizontal transverse support shaft oscillatably supported from said journals for oscillation about a horizontal axis extending transversely of said rear end portion of said arm and said support, motorized drive means carried by a lower rear portion of said support and including a slow turning rotatable output shaft, single pitman arm means pivotally eccentrically connected to said output shaft to one end and removably pivotally connected to the rear end of said arm at the other end thereof rearward and on the side of said axis remote from said upper plate for oscillation of said arm and swinging movement of said upper plate about said axis toward and away from said lower plate in response to rotation of said output shaft, gravity type counterbalance means operatively connected to said support arm over-balancing said arm, when the latter is in a horizontal position, for upward swinging of the front end portion of said arm from which said upper plate is suspended and thus said upper plate, away from said lower plate, the front end portion of said arm from which said upper plate is suspended having an elongated handle removably supported therefrom and projecting endwise outwardly thereof, said support including an elevated rear transverse portion extending between said elevated rear portions of said opposite side portions, disposed above the elevation of said axis and from which a pulley wheel is journaled for rotation about a horizontal transverse axis, said counterbalance means including an elongated flexible tension member having one end portion thereof anchored to the front end portion of said arm from which said upper plate is supported at an elevation appreciably below said pulley wheel when said arm is horizontally disposed, the other end portion of said tension member extending upwardly and rearwardly from said arm and being trained over said pulley wheel and depending freely downwardly therefrom and having a weight member supported therefrom, said motorized drive means including motor and reduction gear units mounted on said support in transversely spaced relation below said axis of oscillation of said support shaft and including output and input shaft portions, respectively, rotatable about front to rear extending axes and provided with aligned drive and driven wheels, respectively, an endless flexible drive member trained about said wheels drivingly connecting the drive wheel to the driven wheel, said output shaft comprising a rotatable output shaft projection outwardly from said reduction gear unit transversely of said support toward said motor unit and having single eccentric crank means mounted thereon centrally intermediate said units and to which said one end of said pitman arm is connected, said support arm, eccentric crank means and said pitman arm means being disposed centrally intermediate the opposite side portions of said support.

* * * * *